Dec. 25, 1951 M. DI DOMENICO 2,580,081
PIECRUST TRIMMING AND SCALLOPING DEVICE
Filed Sept. 20, 1949
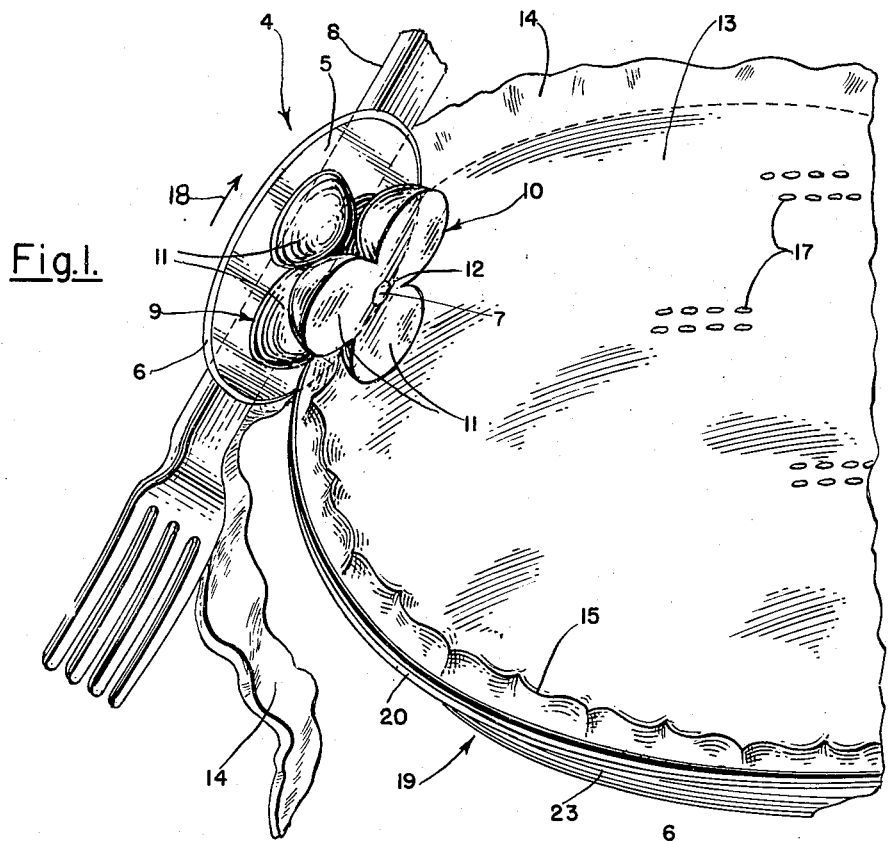
Fig.1.
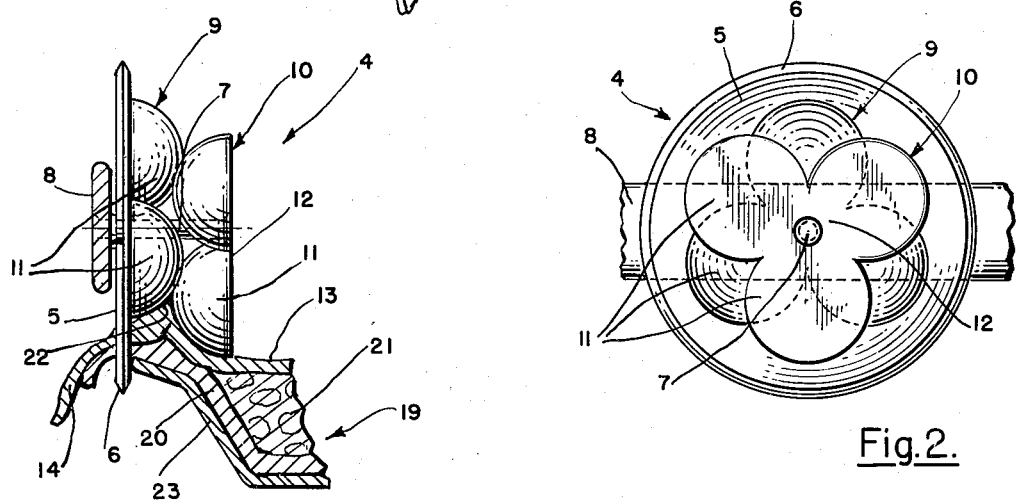
Fig.3.
Fig.2.
INVENTOR.
Mary Di Domenico
BY
Attorney

Patented Dec. 25, 1951

2,580,081

UNITED STATES PATENT OFFICE 2,580,081

PIE CRUST TRIMMING AND SCALLOPING DEVICE

Mary Di Domenico, Chicago, Ill.

Application September 20, 1949, Serial No. 116,748

2 Claims. (Cl. 107—49)

My invention relates to pie crust trimming and scalloping devices.

In the making of pies, the lower and upper pie crusts are placed in the pie tin with their edges over-lapping the edge of the pie tin requiring a trimming operation and an edging operation to trim and bind the edges of the dough forming upper and lower pie crusts, therefore, it is a prime object of my invention to provide a pie crust trimming and scalloping device which simultaneously performs both of the above described operations of trimming and edging or scalloping the dough of the pie crust preparatory to baking.

A further object of my invention is to provide a pie crust trimming and scalloping device of the above described character, that will form an even and ornamental edging or scalloping on the outer edge of the pie crust, at the same time resulting in a more perfect pie crust joining operation than can be formed by pinching the dough with the fingers, which is the ordinary method.

A still further object of my invention is to provide a pie crust trimming and scalloping device that may be mounted upon the handle of a kitchen utensil, such as a fork, the tines of which could be used to pierce the pie crust for the necessary air holes.

A further object of my invention is to provide a pie crust trimming and scalloping device of simple design that may be economically manufactured in quantity.

Other objects and advantages embraced in my invention will be disclosed in the following description and the accompanying illustrations, wherein like parts are designated by like numerals and in which:

Fig. 1 is a perspective view of my device mounted upon the handle of a fork shown trimming and scalloping the edge of a pie.

Fig. 2 is a side view of my invention showing the staggered relationship of the dough edging and scalloping elements.

Fig. 3 is an end view of my invention, partly in cross-section, showing the trimming, edging and binding operation of my pie crust trimming and scalloping device on the over-lapping upper and lower crusts of a pie.

Referring to the illustrations, my invention is generally designated 4 and consists of a cutting disc 5, having a sharp cutting edge 6 and being rotatably mounted by an axle 7 upon the handle of a kitchen utensil, such as a fork 8. Two dough edging and scalloping elements 9 and 10 are mounted upon axle 7 to rotate with cutting disc 5.

The said scalloping elements 9 and 10 consist of a number of hemispherical portions 11, in the present instance, three of the said hemispherical portions 11 are joined together, making a clover leaf shaped formation about a central attaching portion 12. The scalloping elements 9 and 10 are mounted upon axle 7 with the hemispherical portions thereof in staggered and facing relationship, providing forming spaces 22 alternately between the said hemispherical portions 11 of elements 9 and 10.

A pie here designated 19, customarily consists of a lower or bottom pie crust 20 and an upper pie crust 13, with a filling 21 therebetween and supported in a pie tin 23. In placing the upper and lower pie crusts 13 and 20 in tin 23, overlapping portions 14 necessarily extend past the edge of the said pie tin 23. The over-lapping portions 14 must be trimmed off and the pie crusts 20 and 13 must be joined at their outer perimeters in preparing the pie for baking. Using my invention for this purpose, the fork handle 8 is held in one hand, while the pie 19 is steadied with the other, the cutting disc of the pie crust trimming and scalloping device is rotated in the direction of arrow 18 about the outer edge of the pie 19, using the outside circumference of the said pie tin 23 as a guide, the cutting disc 5 trims and removes the over-lapping portion 14. Simultaneously, the staggered dough edging and scalloping elements 9 and 10 are revolving with cutting disc 5 to perform a pinching and binding operation on the edges of the pie crusts 13 and 20, resulting in a scalloped formation 15, about the outer edge of pie 19.

A particular advantage of my pie crust trimming and scalloping device is that it performs the trimming and scalloping operations simultaneously, at the same time performing a much better pie crust joining operation than is possible by pinching the dough with the fingers. The resulting scalloped formation about the edge of the pie makes a regular and decorative design, enhancing the appearance of the pie and will seal the pie crust to retain the juices of the pie.

When my invention is mounted upon the handle of a fork, the tines of the fork may be used for piercing the pie crust for the holes 17 to permit escape of the vapor generated in baking the pie.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. In pie crust trimming and scalloping means including a rotatable knife blade element, scalloping means secured to the said knife blade element, the said scalloping means including two sections, each of said sections composed of at least three hemispherical portions, the curved portions thereof enmeshed in staggered relationship, the flat portions thereof facing outwardly.

2. In pie crust trimming and scalloping means including a rotatable knife blade element, scalloping means secured to the said knife blade element, the said scalloping means including two sections, each of said sections composed of at least three hemispherical portions, the curved portions thereof enmeshed in staggered relationship, the flat portions thereof facing outwardly, the diametral magnitude of the said knife blade element exceeding the perimetral magnitude of the said scalloping means.

MARY DI DOMENICO.

REFERENCES CITED

The following references are of record in the file of this patent:

UNITED STATES PATENTS

| Number | Name | Date |
|---|---|---|
| 67,601 | Stephen | Aug. 6, 1867 |
| 71,274 | Brown | Nov. 26, 1867 |
| 76,813 | Redding et al. | Apr. 14, 1868 |
| 820,553 | Clem | May 15, 1906 |
| 868,359 | O'Brien | Oct. 15, 1907 |